May 12, 1953 W. B. MARTIN 2,638,497

TELEGRAPH CALL TRANSFERRING SYSTEM

Filed March 8, 1952 3 Sheets-Sheet 1

INVENTOR
W. B. MARTIN
BY R. C. Terry
ATTORNEY

May 12, 1953 W. B. MARTIN 2,638,497

TELEGRAPH CALL TRANSFERRING SYSTEM

Filed March 8, 1952 3 Sheets-Sheet 2

INVENTOR
W. B. MARTIN
BY R. C. Terry
ATTORNEY

TELEGRAPH CALL TRANSFERRING SYSTEM

Filed March 8, 1952 3 Sheets-Sheet 3

INVENTOR
W. B. MARTIN
BY R. C. Perry
ATTORNEY

Patented May 12, 1953 2,638,497

UNITED STATES PATENT OFFICE 2,638,497

TELEGRAPH CALL TRANSFERRING SYSTEM

Wade B. Martin, Ramsey, N. J., assignor to American Telephone and Telegraph Company, a corporation of New York Application March 8, 1952, Serial No. 275,597

6 Claims. (Cl. 178—2)

Figure 1:
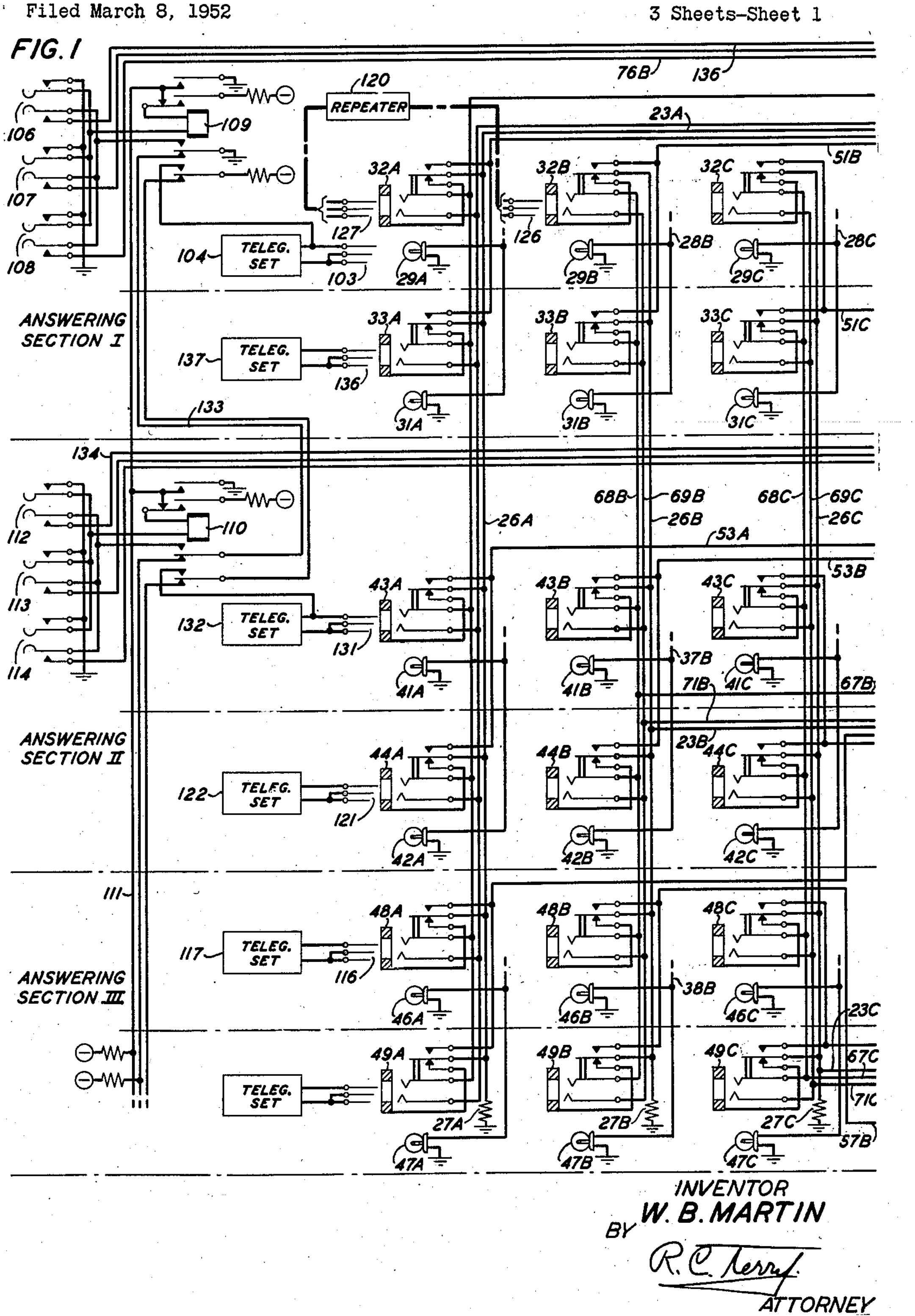

This invention relates to telegraph systems and particularly to a telegraph switchboard arrangement.

It is set forth in Patent 2,139,798, granted December 13, 1938, to A. R. Bonorden et al. that it is essential in test board operations in a telegraph system for attendants in two localities having charge of a particular service at their respective switchboards, to obtain direct communication with each other, and that it is consequently desirable to have an arrangement which will facilitate certain direct communication or permit of an incoming call being rapidly transferred to an attendant responsible for a particular service. It is further set forth therein that the facilities disclosed permit each position in a line of test boards to become a potential transfer point and in the larger offices the facilities extend to arrangements for transferring a call to any one of two or more positions. In accordance with the disclosed arrangement an attendant at a multiposition switchboard may, upon receiving an incoming call over an intercity telegraph communication trunk, transfer the incoming call signal to any particular one of a plurality of trunk call indicating signal lamps, each of which is located at a different position in the switchboard.

As telegraph switching networks have become more extensive and correspondingly more complex, circumstances have arisen under which a test board operator in one city has need to communicate telegraphically with a test board operator in another city to which no direct telegraph trunk extends. However, the test boards at both cities may have direct telegraph trunk connection to a third city where the needed intercommunication connection between them could be established by interconnecting the terminals of their respective trunk circuits through a patching cord circuit.

The system disclosed in the Bonorden et al. patent is generally unsuited to the interconnection of the terminals of intercity telegraph channels or trunks. The unsuitability of the Bonorden et al. arrangement for this mode of operation resides mainly in the circuit relationships among the signal lamp control circuits. These relationships are such that upon the transferring of an incoming call signal to a trunk lamp at a particular position to indicate a call waiting on the particular trunk to be answered at that position, there being at the time a cord interconnection between the terminals of two trunks having answering appearances in the form of jacks at the particular position, the call indicating lamps of the interconnected trunks will light along with the call indicating lamp of the trunk having the waiting call, thereby giving rise to confusion because the operator at the particular position will have no way of knowing which lamp represents the call being transferred to him.

Accordingly, it is an object of this invention to provide for the interconnection of trunk or toll line circuits by means of a cord circuit at any of the multiple appearances of jack terminations of said trunk or toll line circuits without producing erroneous or misleading call indications.

In accordance with a preferred embodiment of the invention, each toll line circuit or trunk terminating in a switching office has a two-way repeater, a terminating control circuit and a multiplicity of jacks by means of which communicative connection with the trunk or toll line circuit may be made. The jacks associated with any trunk or toll line are located in different answering positions. Two or more of such positions may comprise an answering section. Certain of the answering positions are provided with manually operable keys and these positions are call transferring positions. Each jack has associated with it a call indicating lamp.

When a call is received on one of the trunks or toll lines, a relay in the terminating control circuit is operated to cause the lighting of the call indicating lamps associated with certain jacks individual to that toll line or trunk circuit, and also causes a busy condition to be imposed upon all other jacks terminating the trunk circuit over which the answering operator is about to communicate with the calling operator. The busy signal will remain during the period the terminating control circuit is activated by an inward call, a transfer call or by a plug inserted in the circuit multiple jack. An operator answers the call at any one of the call transferring positions by inserting into the jack in that position allocated to the trunk circuit on which the call is waiting, the plug of the cord circuit having associated therewith a telegraph set which may comprise a telegraph key and sounder or a transmitting and receiving teletypewriter set. The insertion of the plug into the jack results in the extinguishment of the call indicating lamps. The operator then communicates telegraphically over the trunk or toll line circuit with the remote test board operator and ascertains the identity of the particular test board service position for which the call is intended. Thereupon the operator manually operates one of the call transferring keys, namely, the one individual to the answering section that is to receive the call. The operation of the key causes the lighting of call indicating lamps at the multiple appearances of the trunk jacks in the particular answering section. Thereupon the operator restores the call transferring key to normal and disconnects his telegraph set by withdrawal of the plug from the jack. Any one of the operators in the answering section where the call indicating lamps have been lighted as a result of the call transferring operation may answer the call merely by plugging into the jack the cord plug of his telegraph set. This causes the lamps to be extinguished. At the conclusion of the intercommunication the answering operator merely withdraws the cord plug of his telegraph set, the busy condition is removed and the trunk termination is restored to its normal idle condition.

When an incoming call is answered at a call transferring position in the manner hereinbefore described and it is ascertained that the calling test board operator wishes to communicate with a test board operator reached over one of the other trunk circuits, the answering operator establishes the desired connection by withdrawing the cord plug of his telegraph set from the jack on which the call has been answered and by inserting into that jack, and into the jack at the same position terminating the trunk circuit over which the call is to be extended, the plugs of a cord circuit which includes a supervisory repeater. This imposes a busy condition on the jack multiples of both trunk circuits but does not cause a lighting of call indicating lamps associated with either jack. Moreover, the subsequent answering of calls at the same call transferring position and the transferring of those calls to other answering positions will not result in the lighting of call indicating lamps at any of the jack multiples of the two trunk circuits that are interconnected through the cord circuit and repeater.

Figure 2:
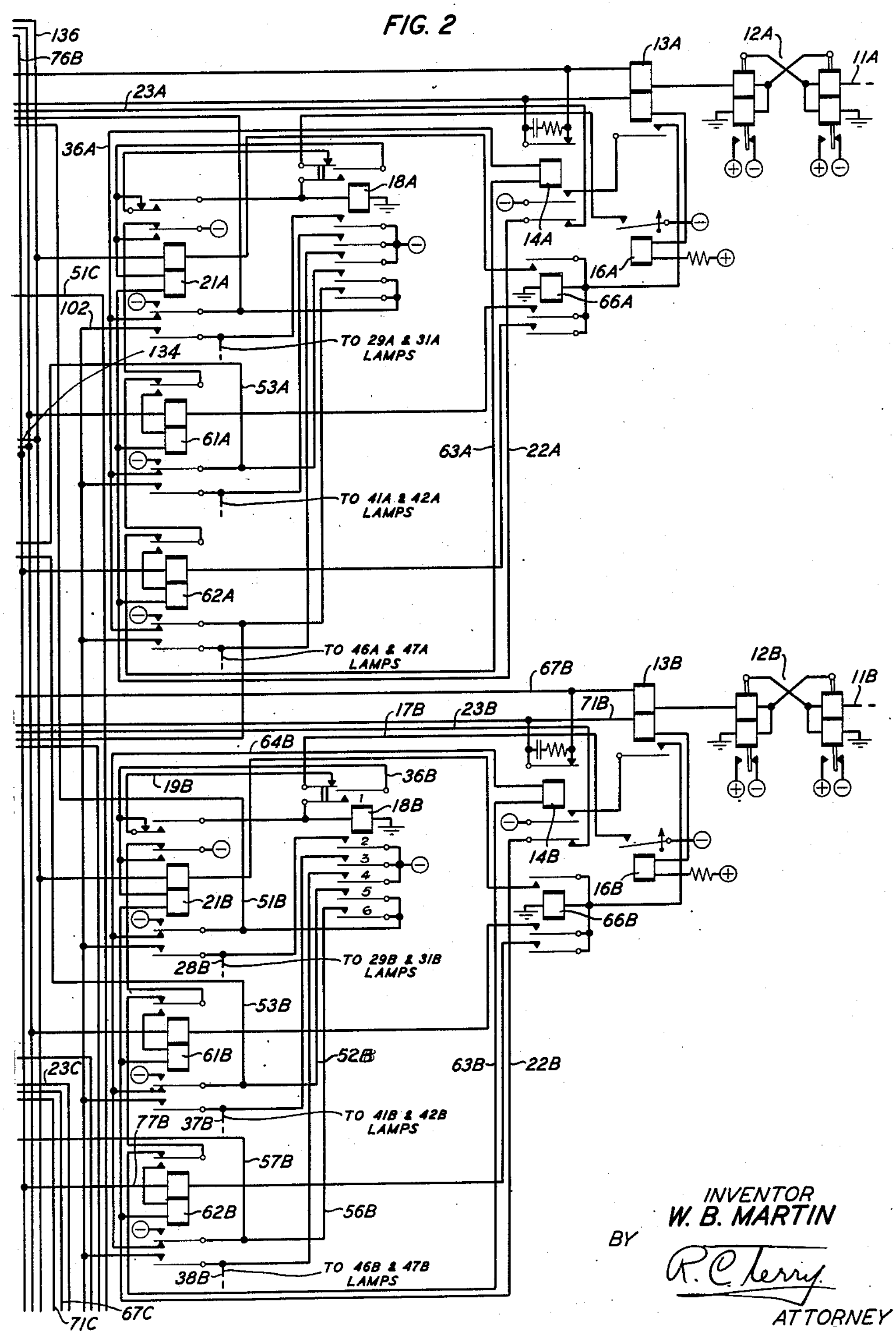
Figure 3:
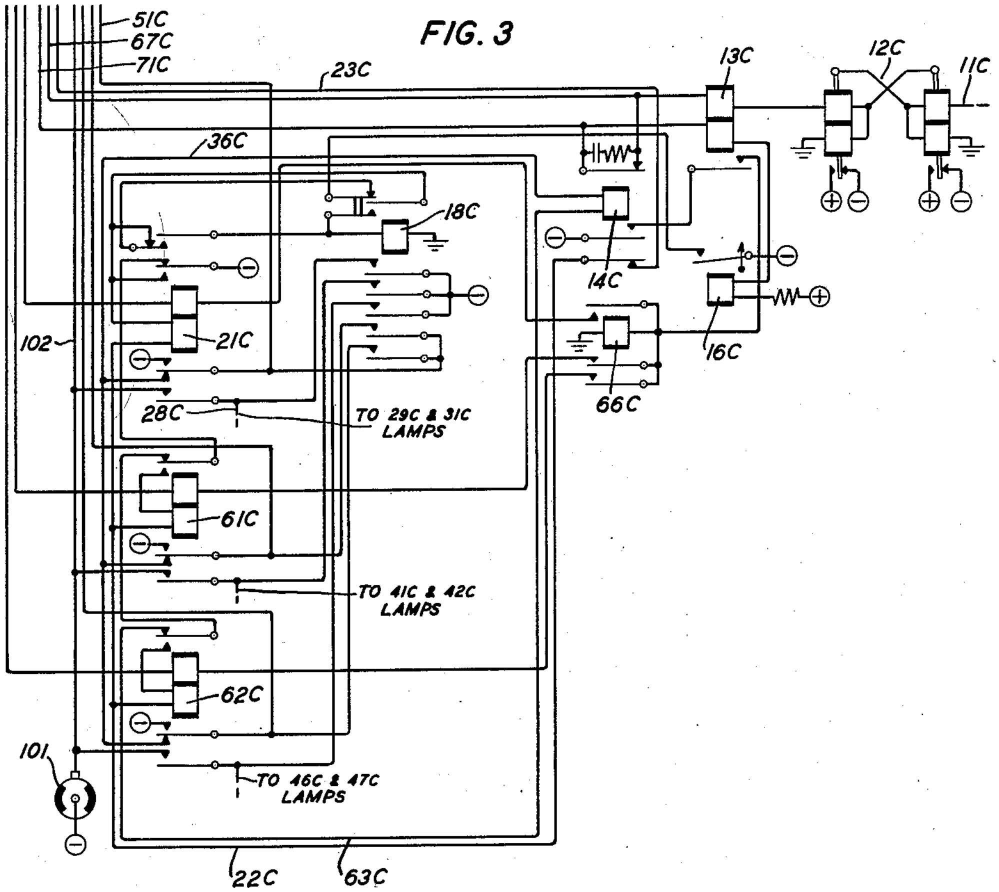
Figure 4:
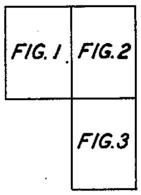

For a complete understanding of the invention reference may be had to the following detailed description to be interpreted in the light of the accompanying drawings in which Figs. 1, 2 and 3, when arranged as diagrammatically represented in Fig. 4, show the terminating circuits of three intercity trunks and the jack multiples for those trunks in three answering sections, each comprising two answering positions, and one position of each of two of the answering sections being a call transferring position.

Referring to the drawings and particularly to Figs. 2 and 3 the reference numerals 11A, 11B and 11C designate three incoming intercity trunk circuits which terminate in two-way repeaters, 12A, 12B and 12C respectively. The invention will be described in terms of a supposed call incoming over trunk 11B and intended for the answering section III shown in the lower part of Fig. 1 and comprising two answering positions neither of which is a transferring position.

In the idle condition of the circuit terminating trunk 11B, before the call is received, a circuit is traced from negative battery on the marking contact of the receiving relay of repeater 12B through the upper winding of relay 13B, upper armature and back contact of relay 14B, lower winding of relay 13B and winding of relay 16B to positive battery. Relay 13B is differentially wound so that current through the two windings produces opposing magnetic fields which neutralize each other and the armature of relay 13B is released. Relay 16B is energized and holds its single armature out of engagement with its back contact.

An incoming call over a trunk circuit is indicated by a prolonged spacing signal. When such a signal is received over trunk 11B the receiving relay of repeater 12B operates to spacing, connecting positive battery through the circuit just traced to oppose the positive battery connection on relay 16B and this relay which has a slow release characteristic releases after a delay interval. Relay 16B is made slow release so that it will not release in response to the spacing signals occuring during normal intercommunication.

Upon the release of relay 16B negative battery is connected through its armature and back contact, conductor 17B, break contacts controlled by armature 1 of relay 18B, conductor 19B, break contacts associated with the outer upper armature of relay 21B, lower winding of that relay, conductor 22B, outer lower armature and back contact of relay 14B, conductor 23B extending into Fig. 1, and conductor 26B to ground through resistor 27B. Conductor 26B is common to the jacks terminating trunk 11B at all answering positions and the completion of this path results in the energization of the lower winding of relay 21B as well as the imposition of a busy indication on the jack multiple conductor 26B by virtue of the connection of negative battery thereto through the lower winding of relay 21B. Relay 21B thus becomes operated. At its inner upper armature and front contact it connects negative battery to its lower winding in parallel with the negative battery from which it became energized thus establishing a locking circuit. At its outer lower armature relay 21B extends an intermittent negative battery connection supplied through interrupter 101 and conductor 102 over conductor 28B to lamps 29B and 31B in Fig. 1. These lamps are associated with jacks 32B and 33B respectively located in the two answering positions of answering section I. These lamps begin to flash to indicate to the operators at the two positions in answering section I that a call is waiting on trunk 11B but the flashing is almost immediately superseded by steady lighting of the lamps, as will now be described.

When the outer upper armature of relay 21B operates the break contacts transfer the battery connection from which it was operated to the winding of relay 18B, and this relay operates. Relay 18B locks in a circuit traced from ground through its winding, front contact and armature 1, conductor 36B, front contact and inner upper armature of relay 21B and negative battery, the holding circuit for relay 18B thus having a portion common to the holding circuit for relay 21B. At its armatures 2, 3 and 4, relay 18B connects negative battery to conductor 28B previously identified, and also to conductors 37B and 38B. The battery connection supplied to conductor 28B will mask the connection supplied through interrupter 101 and cause lamps 29B and 31B to be lighted steadily. The battery connection supplied over conductor 37B causes the lighting of call indicating lamps 41B and 42B associated with jacks 43B and 44B terminating trunk circuit 11B at the two positions of answering section II shown in the middle of Fig. 1. Similarly, battery connection supplied over conductor 38B causes the lighting of lamps 46B and 47B associated with jacks 48B and 49B in the two positions of answering section III shown in the lower portion of Fig. 1.

When relay 21B became operated a connection from negative battery was extended through its inner lower armature and front contact and over conductor 51B to the make contact springs of jacks 32B and 33B. With relay 18B operated this battery connection is extended through the armature 5 and front contact of relay 18B and conductors 52B and 53B to the make contact springs of jacks 43B and 44B. This same battery connection is also extended over armature 6 and front contact of relay 18B and conductors 56B and 57B to the make contact springs of jacks 48B and 49B.

The call signal comprising the spacing condition on trunk 11B is transmitted from the remote terminal thereof for a sufficient interval to assure release of slow release relay 16B whereupon the operator at the remote terminal restores the normal marking condition on the trunk. This results in the reenergization of relay 16B and consequent disconnection of negative battery from conductor 17B. Since relay 21B has established a locking circuit for itself and for relay 18B these relays are not affected by the reenergization of relay 16B.

It will be assumed that the call is answered at the uppermost answering position in answering section I, namely, at the jack 32B. Since all of the lamps 29B, 41B, 42B, 46B and 47B are lighted the call might be answered at any one of the six answering positions shown in Fig. 1. The reason for registering incoming calls at answering positions or answering sections which have no transferring means, such as the answering section III comprising positions having jacks 48B and 49B, will be described hereinafter. The call is answered at jack 32B by the insertion of plug 103 associated with telegraph set 104 into jack 32B. As previously stated, telegraph set 104, indicated in Fig. 1 by a labeled rectangle, may comprise a telegraph key and sounder for mnual or Morse telegraphy or it may comprise a teletypewriter transmitting and receiving device. If the teletypewriter apparatus is employed it may be in the form of a keyboard transmitter and tape printer such as the unit disclosed in Patent 1,745,633, granted February 4, 1930, to S. Morton et al. or it may be a keyboard transmitter and page printer such as, for example, the one disclosed in Patent 1,904,164, granted April 18, 1933, to S. Morton et al.

Upon the insertion of plug 103 into the jack the make contacts at the top of the jack close, the negative battery connection supplied through the front contact and inner lower armature of relay 21B and over conductor 51B as previously described is extended to conductor 26B. The holding circuit of relay 21B obtains its completing ground connection from conductor 26B, so that the path through the lower winding of relay 21B to negative battery is now shunted by a direct connection to negative battery. The holding circuit of the relay is thus rendered ineffective and the relay 21B releases. In releasing it interrupts the holding circuit of relay 18B which also releases. With both of these relays released, all of the call indicating lamps 29B, 31B, 41B, 42B, 46B and 47B are extinguished.

With relay 21B released, negative battery is connected through its inner upper armature and back contact, the upper armature and back contact of relay 61B, upper armature and back contact of relay 62B, conductor 63B, winding of relay 14B, conductor 64B, back contact and inner lower armature of relay 21B, conductor 51B, make contacts of jack 32B and conductor 26B to ground through resistor 27B. Relay 14B operates in this circuit and the negative battery connection supplied through its winding maintains the busy condition on jack multiple conductor 26B. At its outer lower armature and back contact the relay 14B disables the energizing circuits of the lower windings of relays 21B, 61B and 62B so that none of those relays can be operated or locked through its lower winding. At its inner lower armature and front contact the relay 14B prepares an energizing circuit for relay 66B. At its upper armature and back contact relay 14B opens a direct path from the upper to the lower winding of relay 13B so that the path through the windings of relay 13B is now traced from negative battery on the marking contact of the receiving relay of repeater 12B, upper winding of relay 13B, conductor 67B, tip multiple conductor 68B of jacks 32B, 33B, 43B, 44B, 48B, 49B, tip of jack 32B and plug 103, telegraph set 104, ring of plug 103 and jack 32B, ring multiple conductor 69B, conductor 71B, lower winding of relay 13B and winding of relay 16B to positive battery. It is thus seen that when relay 14B is released, the upper armature and back contact shunt the open circuit condition of the tip and ring multiple conductors 68B and 69B and provide for the energization of both windings of relay 13B and the winding of relay 16B. With telegraph set 104 connected between the tip and ring multiple conductors, and the shunt at upper armature and back contact of relay 14B removed, the telegraph set is enabled to transmit and receive.

With this condition of the apparatus the operator communicates telegraphically by means of telegraph set 104 with the operator at the remote end of the trunk 11B and ascertains the answering section or operator with which the remote operator on trunk 11B desires to communicate. In a large telegraph office the test room personnel may be divided into sections along functional lines. The activities of each section may be confined to a small area geographically in the office and the remote operator may wish to communicate with an operator in a particular answering section in accordance with the functional subdivision of the sections. Let it be assumed that the operator who has answered the call learns that communication with an operator in answering section III in Fig. 1 is desired.

The call transferring operation is initiated by momentary operation of one of the keys 106, 107 or 108. The transferring of a call to lower answering section III is accomplished by the operation of key 108. At its upper make contacts key 108 completes an energizing circuit for transfer relay 109 from ground through those make contacts and the winding of that relay, break contacts controlled by the inner upper armature of the relay and conductor 111 to negative battery. It will be noted that the operator of keys 106 and 107 causes the operation of relay 109 also, since their upper make contacts are connected in parallel with those of key 108. At its outer upper armature and front contact the relay 109 connects ground to conductor 111 thereby preventing the operation of transfer relay 110 of answering section II of Fig. 1 should any one of the call transferring keys 112, 113 or 114 be operated while a call is being transferred in section I. At its inner upper armature and front contact, the relay 109 connects battery to its winding to prevent the release of that relay due to the grounding of conductor 111. At its inner lower armature and front contact relay 109 connects ground through the lower make contacts of key 108, conductor 76B, conductor 77B, upper winding of relay 62B to the front contact associated with the outer lower armature of relay 66B, the energizing circuit of which has been prepared at the inner lower armature of relay 14B as previously mentioned. At its outer lower armature and front contact relay 109 connects negative battery to the tip of plug 101 whereby the battery connection is extended over tip multiple conductor 68B, conductor 67B to the upper winding of relay 13B. This battery connection is also extended through the telegraph set 104 and over the ring multiple conductor 69B, conductor 71B, lower winding of relay 13B and winding of relay 16B to positive battery. Both terminals of the upper winding of relay 13B are now terminated at negative battery thus shunting this winding. The circuit of the lower winding of the relay is maintained energized, and due to the differential relationship of the windings, the lower winding is now effective to operate relay 13B which, at its single armature and front contact, completes the prepared circuit for relay 66B which operates.

Relay 66B extends a negative battery connection through its three armatures to the upper windings of relays 21B, 61B and 62B. As previously stated the energizing circuit for the upper winding of relay 62B has been prepared at the inner lower armature and front contact of relay 109 and the lower make contacts of key 108 so that relay 62B operates. Neither of the relays 21B nor 61B has a circuit prepared for the energization of its upper winding so that these relays remain released. The shunting of the circuit which includes the upper winding of relay 13B causes the sending relay to operate to spacing and transmit a spacing signal to the remote end of trunk 11B to indicate to the operator at that point that a transfer is being made. Telegraph set 104 is held in marking condition during this interval because it is included in the energizing circuit of relay 16B between the positive battery on the winding of that relay and the negative battery supplied through the outer lower armature and the front contacts of relay 109.

At its upper armature relay 62B interrupts the energizing circuit of relay 14B and prepares a holding circuit for itself from negative battery through the inner upper armature and back contact of relay 21B, upper armature and back contact of relay 61B, its own upper armature, front contact and lower winding, conductor 22B, outer lower armature and back contact of relay 14B when that relay releases, conductor 23B and jack multiple conductor 26B to ground through resistor 27B. The battery connection supplied over this path to jack multiple conductor 26B imposes a busy condition on conductor 26B in substitution for the one supplied through the winding of relay 14B, the inner lower armature and back contact of relay 21B, conductor 51B and the make contacts of jack 32B. At its inner lower armature and front contact relay 62B extends a negative battery connection over conductor 57B to the upper contact springs of the make contacts of jacks 48B and 49B in preparation for the imposition of a busy condition on jack multiple conductor 26B through the make contacts of one or the other of those jacks. At its outer lower armature and front contact relay 62B connects intermittent battery over conductor 38B to cause lamps 46B and 47B to flash.

The relay 14B, in releasing, releases relay 66B through which relay 62B became operated. Since relay 62B is now held operated through its holding circuit, including its lower winding, it is not affected by the release of relay 66B. Relay 14B, in releasing, also reconnects the shunt from the upper winding of relay 13B to its lower winding, thereby reestablishing current through the circuit of the upper winding of relay 13B to terminate the transmission of the spacing signal to the remote terminal of trunk 11B. With this shunt reestablished the circuit of telegraph set 102 is shunted and its goes to spacing, indicating to the operator who answered the call by means of telegraph set 102 that the transfer has been completed. Thereupon, the operator releases key 108 and withdraws plug 103 from jack 32B. With both windings of relay 13B again energized, the armature of that relay releases and further disables the circuit of relay 66B. The condition of the apparatus now is that relay 62B is held operated and lamps 46B and 47B are flashing. Relay 16B which is normally operated remains operated and transfer relay 109 is released upon the release of key 108. The apparatus remains in this condition until one of the operators in answering section III in the lower portion of Fig. 1 answers the call indicated by the flashing lamps 46B and 47B. It will be assumed that the call is answered at jack 48B in the upper answering position of the section III by the insertion into jack 48B of plug 116 having telegraph set 117 associated with it. This results in the closure of the make contact springs of the jack whereby a negative battery connection applied through the front contact and inner lower armature of relay 62B is extended over conductor 57B through the make contacts of jack 48B to jack multiple conductor 26B. This renders ineffective the holding circuit of relay 62B by shunting the lower winding, and the relay releases. Relay 62B extinguishes lamps 46B and 47B and momentarily removes the busy condition from jack multiple conductor 26B but immediately reestablishes the busy condition in a circuit from negative battery through the inner upper armature and back contact of relay 21B and the upper armature and back contact of relays 61B and 62B in series, conductor 63B, the winding of relay 14B, conductor 36B, the inner lower armature and back contact of relay 62B, conductor 57B and the make contacts of jack 48B to the jack multiple conductor 26B.

Relay 14B reoperates in this circuit but no effective circuit changes result from the operation of its lower armatures. At its upper armature the shunting connection between the upper and lower windings of relay 13B is again removed, this time removing a shunt across the telegraph set 117 and rendering that set effective to transmit and receive signals. This condition of the apparatus continues during the intercommunication between telegraph set 117 and the remote operator over trunk 11B, with only the relays 14B and 16B operated. Relay 16B does not follow the signals that are transmitted in either direction because of its slow release characteristic. Relay 13B does not operate its armature in response to signals transmitted in either direction because its two windings are simultaneously energized in response to marking signals and simultaneously deenergized in response to spacing signals and the differential relation of its windings prevents the operation of the armature. At the conclusion of intercommunication the operator disconnects by withdrawing plug 116 from jack 48B. This results in the release of relay 14B and the removal of the busy condition from jack multiple conductor 26B. Relay 14B restores the shunt connection from the upper winding of relay 13B to its lower winding and the system is thereby restored to its initial condition with only the relay 16B operated.

It will now be assumed that the operator at one of the answering positions has occasion to initiate a call over one of the intercity trunks. Specifically, it will be assumed that the operator at the non-transferring position of answering section II wishes to communicate with a test operator at the remote terminal of trunk 11A. Since jack 44A is the only one at his answering position that is associated with trunk 11A he inserts plug 121 of his telegraph set 122 into that jack, making the usual busy test to determine whether the multiple with which jack 44A is associated is busy before inserting the plug into the jack. At its make contacts the jack 44A connects jack multiple conductor 26A, which is connected through resistor 27A to ground, over conductor 53A, the inner lower armature and back contact of relay 61A, conductor 36A, winding of relay 14A, conductor 63A, back contact of upper armature of relays 62A and 61A in series, and back contact and inner upper armature of relay 21A to negative battery. The battery connection supplied to jack multiple conductor 26A through the winding of relay 14A imposes a busy condition on the conductor and relay 14A operates in the path just traced. At its upper armature and back contact relay 14A removes the shunting interconnection between the upper and lower windings of relay 13A, thereby also removing a shunt across the tip and ring of jack 44A and rendering the transmitting relay of repeater 12A responsive to telegraph set 122. At its outer lower armature and back contact relay 14A interrupts the path from the lower winding of relay 21A, over conductors 22A and 23A to jack multiple conductor 26A since relay 21A is not to be operated in response to an outgoing call as it would be operated in response to an incoming call upon the release of relay 16A.

The operator then operates the break key of telegraph set 122 to transmit a long spacing signal over trunk 11A to the remote terminal thereof. This long spacing signal is the calling signal and serves to register the call at the remote terminal of the trunk in the same manner that relay 16A would respond to the call signal of an incoming call, causing the operation of relay 21A by energization of its lower winding. Since the energizing circuit of relay 16A is interrupted at the break contacts of telegraph set 122, this relay releases after the delay interval provided by its slow release characteristic. It does not cause relay 21A to operate because the energizing circuit of that relay is disabled at he outer lower armature and back contact of operated relay 14A as previously set forth. After the continuous spacing signal has been impressed upon the trunk for a sufficient interval to cause the release of the relay corresponding to the relay 16A at the remote terminal of trunk 11A, the operator recloses the break key of telegraph set 122 and waits for the remote operator to answer. At the end of intercommunication between the two operators, plug 121 is withdrawn from jack 44A to disconnect telegraph set 122. This results in the release of relay 14A and removal of the busy condition from jack multiple conductor 26A, thereby restoring the terminating circuit for trunk 11A to normal.

It will now be assumed that a call is received over trunk 11A to be extended over trunk 11B to the test operator at the remote terminal thereof. Reception of the call is evidenced by release of relay 16A which causes relay 21A to operate, this relay in turn causing the relay 18A to operate. As a result of the operation of these two relays, a busy condition from the battery in the operating circuit of relay 21A is impressed upon jack multiple conductor 26A and lamps 29A, 31A, 41A, 42A, 46A and 47A are lighted steadily. These operations are the same as those described in detail in connection with reception of a call over trunk 11B. It will be supposed that the call is answered by means of telegraph set 104 by insertion of plug 103 into jack 32A. This results in the release of relays 21A and 18A, the extinguishment of the lamps 29A, 31A, 41A, 42A, 46A, and 47A and operation of relay 14A. The operator inquires telegraphically concerning the desired destination of the call and learns that the calling operator wishes to communicate with the operator at the remote terminal of trunk 11B. Thereupon the operator inserts plug 126 of a cord circuit including supervisory repeater 120 into jack 32B.

Repeater 120 is a conventional two-way telegraph repeater with supervisory features, such as disconnect signal responsive relays. Before the plugs 126 and 127 are inserted into line terminating jacks the circuits of operating windings of the repeating relays are incomplete, and those relays are in the spacing condition. Upon the insertion of plug 126 into jack 32B the spacing condition of the relay in the circuit of the other plug 127 causes a spacing signal to be transmitted over trunk 11B, and this spacing condition is the calling signal, as previously stated. Thereafter the operator withdraws plug 103 from jack 32A and substitutes in that jack the other plug 127 of the cord circuit. The insertion of this plug terminates the calling signal by completing the circuit of the relay winding connected to the plug.

With plug 126 inserted into jack 32B, relay 14B operates to remove the shunt across the tip and ring springs of jack 32B and to impose a busy indication on jack multiple conductor 26B. Relay 14A releases momentarily as a plug 101 is withdrawn from jack 32A, to reoperate upon the immediate insertion of plug 127 into that jack. When the test board operator at the remote terminal of trunk 11B answers, his answering signals are repeated by repeaters 12B, 120 and 12A to the operator at the remote terminal of trunk 11A. These two operators may now communicate back and forth without producing any call indications or without operating any apparatus except the repeaters through which the signals are being transmitted at the switching center where the two trunks are interconnected. Because relays 14A and 14B are operated, the relays 16A and 16B, if either should be operated in response to a long spacing signal, will not cause relay 21A or 21B to operate so that none of the lamps 29A, 31A, 41A, 42A, 46A, 47A, 29B, 31B, 41B, 42B, 46B and 47B can be operated. If, while communication is taking place over the interconnected trunks, a call should be received over trunk 11C, relay 16C will be released and will cause the operation of relay 21C, followed by the operation of relay 18C. These two relays will cause the lighting of lamps 29C, 31C, 41C, 42C, 46C and 47C. None of the other lamps in Fig. 1 will be lighted so that there will be no confusion as to the identity of the trunk over which the call has been received or the jacks at which it may be answered. It will be assumed that the call is intended for an operator in the answering section I, and that it is answered at the transferring position in the answering section II by the insertion of plug 131 of telegraph set 132 into jack 43C. This will result in the release of relays 21C and 18C and the extinguishment of lamps 29C, 31C, 41C, 42C, 46C and 47C. Upon the release of relay 21C the energizing circuit of relay 14C is completed and this relay operates to enable the answering operator to communicate with the calling operator. Having ascertained the intended destination of the call, the answering operator operates key 112. With this key operated the transferring relay 110 operates and produces the same sequence of operations that were produced by the operation of relay 109 as previously described. It will be specifically noted, however, that the circuit completed at the lower make contacts of key 112 is traced from ground on the inner lower armature of relay 109 through conductor 133, the inner lower armature and front contact of relay 110, the lower make contacts of key 112, conductor 134 and conductor 136 from which branching paths extend to the upper windings of relays 21A, 21B and 21C. Relay 21A cannot be operated through its upper winding unless, with relay 14A operated, relay 13A operates and relay 66A operates. Relay 13A cannot operate because its differentially related windings are included in the communication path between repeater 12A and repeater 120. Relay 21B cannot operate unless, with relay 14B operated, relay 13B operates and relay 66B operates. Relay 13B cannot operate at this time because its differentially related windings are connected in the communication path between repeater 12B and repeater 120. With relay 14C operated, negative battery is connected through its inner lower armature and front contact to prepare the operating circuit for relay 66C. Since relay 110 is operated and plug 131 is engaging the springs of jack 43C, negative battery is connected through the outer lower armature and back contact of relay 109, the outer lower armature and front contact of relay 110, tip of plug 131 and tip spring of jack 43C, conductor 68C and conductor 67C to the left-hand terminal of the upper winding of relay 13C and through telegraph set 132, the ring of plug 131 and the ring contact spring of jack 43C, jack multiple conductor 69C and conductor 71C to the upper terminal of the lower winding of relay 13C. This causes relay 13C to operate due to the shunting of its upper winding while its lower winding and the winding of relay 16C remain energized. The circuit of relay 66C is thus completed and this relay operates. At its three armatures and front contacts the relay 66C offers energizing circuits to the upper windings of relays 21C, 61C and 62C. The circuit of relay 21C is the only one that is prepared and this relay operates, this time through its upper winding. Relay 21C does not complete the circuit of relay 18C because the latter relay is energizable only from negative battery through the armature and back contact of relay 16C and this relay is operated at this time. Relay 21C releases relay 14C and locks in a path traced from negative battery through its inner upper armature, front contact and lower winding, conductor 22C, outer lower armature and back contact of relay 14C, conductor 23C and jack multiple conductor 26C through resistor 27C to ground. This maintains a busy condition on the jack multiple conductor 26C. At its inner lower armature relay 21C connects negative battery over conductor 51C to the make contact springs of jacks 32C and 33C. At its outer lower armature relay 21C connects interrupter 101 which has connection to negative battery, over conductors 102 and 103 to light lamps 29C and 31C in flashing manner. Thereupon the operator may withdraw plug 131 from jack 43C and release transfer key 112 which will result in the release of relay 110. It will be noted that none of the other call indicating lamps in the answering section in the upper portion of Fig. 1 is lighted as a result of the transferring of a call to that section as evidenced by the flashing operation of lamps 29C and 31C under the control of interrupter 101. Thus there is no misleading lighting of the lamps at any of the answering positions to cause confusion as to which jacks have a call waiting to be answered.

The call may be answered at the uppermost answering position of answering section I by the insertion of plug 103 into jack 32C or it may be answered at the adjacent answering position by the insertion of plug 136 of telegraph set 137 into jack 33C. In either case the make contacts of the jack that is operated will connect to jack multiple conductor 26C the conductor 51C which has negative battery connected to it through the inner lower armature and front contact of relay 21C. This negative battery connection shunts the holding circuit for relay 21C previously traced and thereby releases that relay.

With relay 21C released, lamps 29C and 31C are extinguished and the energizing circuit for relay 14C is completed from negative battery through the inner upper armature and back contact of relay 21C and break contacts of relays 61C and 62C, conductor 63C, winding of relay 14C, conductor 36C, back contact and inner lower armature of relay 21C, conductor 51C and break contacts of the jack 32C or 33C at which the call is being answered, to the jack multiple conductor 26C. Intercommunication may now take place between an operator at one of the answering positions in answering section I and the test board operator at the remote terminal of trunk 11C.

When the intercommunication over trunk 11C is terminated the terminating circuit for that trunk is restored to normal by the withdrawal of the telegraph set cord plug from jack 32C or 33C. It has been assumed that this call was received and the transfer made while supervisory repeater 120 was connected by its cord circuit plugs 126 and 127 to jacks 32B and 32A respectively. Since repeater 120 has supervisory features it registers a disconnect signal received over either or both of the trunks 11A and 11B to indicate that intercommunication between the test board operators at the remote terminals of those trunks has been concluded. Upon the appearance of this indication plugs 126 and 127 are withdrawn from the respective jacks, thereby releasing relays 14A and 14B and restoring the trunk terminating circuits to normal.

Reference is now made to the previously mentioned feature that in response to an incoming call, evidenced by the operation of relay 21A, 21B or 21C by current through its lower winding, all of the call indicating lamps pertaining to the trunk over which the call is received, such as lamps 29A, 31A, 41A, 42A, 46A and 47A will be lighted uninterruptedly due to the operation of relay 18A, 18B or 18C, whereas upon operation of relay 21A, 21B or 21C by current through its upper winding, in connection with the transferring of a call, only those of the lamps pertaining to the trunk that are in the answering section to which the call is to be transferred, such as the lamps 29A and 31A, will be lighted, and they will flash rather than glow uninterruptedly. In order to avoid the answering of incoming calls at positions other than transferring positions, routines may be established whereby only calls indicated by flashing lamps are to be answered at non-transferring positions. The flashing of the lamps results from operation of relay 21A, 21B or 21C in connection with the transferring of calls, and if the restriction on the answering of calls is observed, non-transferring positions will not answer calls that require transfer to another position. Either transferring or non-transferring positions in an answering section where a waiting call is indicated by flashing lamps may answer the call. A corollary of the restriction is that calls indicated by steadily lighted lamps are to be answered only at call transferring positions where a transfer may be effected if needed to reach the desired operator.

The relays 18A, 18B and 18C, which cause the steady lighting of all the lamps associated with a particular trunk, provide for a feature known as "random answering." Under some circumstances, such as light traffic periods when the answering sections may not be fully staffed, it may be desirable for incoming calls to be answered at any position. The restriction on answering is suspended during intervals of "random answering" and calls indicated by steadily lighted lamps may be answered at non-transferring positions. An operator answering a call at a non-transferring position and finding that it must be transferred may go to a transferring position and make the transfer, or verbally request another operator to make the transfer.

Although a specific embodiment of the invention has been described herein, it will be understood that the invention is not limited to the specific embodiment but is capable of rearrangement and substitution of parts and elements without departing from the spirit of the invention.

What is claimed is:

1. In a telegraph switching system, a station having a plurality of telegraph channels terminating thereat, a plurality of jack circuits connected to each of said channels and variously located in said station at primary and secondary answering positions, call directing keys at each primary answering position, said keys being common to all channels having jack circuit connections thereat and individual to all other answering positions having jack circuit connections to those same channels, a call indicating lamp associated with each of said jack circuits, means operable by each of said keys for completing the circuits of lamps at the answering positions corresponding to said keys, patching cord means for interconnecting at any primary answering position the jack circuit connections of any two channels having such jack circuit connections at that position, and means for precluding the completion of circuits of the call indicating lamps associated with said interconnected jack circuits upon the subsequent operation of any of said call directing keys.

2. In a telegraph switching system, a station having a plurality of telegraph channels terminating thereat, a plurality of jack circuits connected to each of said channels and variously located in said station at primary and secondary answering positions, call directing keys at each primary answering position, said keys being common to all channels having jack circuit connections thereat and individual to all other answering positions having jack circuit connections to those same channels, a call indicating lamp associated with each of said jack circuits, circuit control means automatically operable in response to a call incoming over any one of said channels for completing the circuits of the lamps associated with all the jack circuits connected to said one channel, and other circuit control means operable by said keys for selectively completing the circuits of the lamps associated with some of the jack circuits connected to said one channel.

3. In a telegraph switching system, a station having a plurality of telegraph channels terminating thereat, a plurality of jack circuits connected to each of said channels and variously located in said station at primary and secondary answering positions, call directing keys at each primary answering position, said keys being common to all channels having jack circuit connections thereat and individual to all other answering positions having jack circuit connections to those same channels, a call indicating lamp associated with each of said jack circuits, circuit control means automatically operable in response to a call incoming over any one of said channels for completing the circuits of the lamps associated with all the jack circuits connected to said one channel, and other circuit control means operable by said keys for selectively completing in a different and distinctive manner the circuits of the lamps associated with some of the jack circuits connected to said one channel.

4. In a telegraph switching system, a station having a plurality of telegraph channels terminating thereat, a plurality of jack circuits connected to each of said channels and variously located in said station at primary and secondary answering positions, call directing keys at each primary answering position, said keys being common to all channels having jack circuit connections thereat and individual to all other answering positions having jack circuit connections to those same channels, a call indicating lamp associated with each of said jack circuits, means operable by each of said keys for completing the circuits of lamps at the answering positions corresponding to said keys, patching cord means for interconnecting at any of said answering positions the jack circuit connections of any two channels having such jack circuit connections at said position, and means for precluding the completion of circuits of the call indicating lamps associated with said interconnected jack circuits upon the subsequent operation of a call directing key to direct to said position a call incoming on another of said channels.

5. In a telegraph switching system, a station having a plurality of telegraph channels terminating thereat, a plurality of jack circuits connected to each of said circuits and variously located in said station at answering positions, a call indicating lamp associated with each of said jack circuits, call directing keys at certain of said answering positions, circuit control means automatically operable in response to a call incoming over any one of said channels for completing the circuits of the lamps associated with all the jack circuits connected to said one channel, and other circuit control means operable by said keys for selectively completing the circuits of the lamps associated with some of the jack circuits connected to said one channel.

6. In a telegraph switching system, a station having a plurality of telegraph channels terminating thereat, a plurality of jack circuits connected to each of said circuits and variously located in said station at answering positions, a call indicating lamp associated with each of said jack circuits, call directing keys at certain of said answering positions, circuit control means automatically operable in response to a call incoming over any one of said channels for completing the circuits of the lamps associated with all the jack circuits connected to said one channel, and other circuit control means operable by said keys for selectively completing in a different and distinctive manner the circuits of the lamps associated with some but not all of the jack circuits connected to said one channel.

WADE B. MARTIN.

No references cited.